United States Patent
Naouri et al.

(10) Patent No.: US 10,708,187 B2
(45) Date of Patent: Jul. 7, 2020

(54) DATA CENTER CONGESTION MANAGEMENT FOR NON-TCP TRAFFIC

(71) Applicant: INTEL CORPORATION, Santa Clara, CA (US)

(72) Inventors: Ygdal Naouri, Jerusalem (IL); Robert O. Sharp, Round Rock, TX (US); Kenneth G. Keels, Austin, TX (US); Eric W. Multanen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 14/285,028

(22) Filed: May 22, 2014

(65) Prior Publication Data

US 2015/0341273 A1  Nov. 26, 2015

(51) Int. Cl.
| | |
|---|---|
| *H04L 12/801* | (2013.01) |
| *H04L 12/911* | (2013.01) |
| *H04L 12/26* | (2006.01) |
| *H04L 12/807* | (2013.01) |
| *H04L 12/46* | (2006.01) |

(52) U.S. Cl.
CPC .......... *H04L 47/18* (2013.01); *H04L 12/4633* (2013.01); *H04L 43/0858* (2013.01); *H04L 43/0864* (2013.01); *H04L 43/16* (2013.01); *H04L 47/27* (2013.01); *H04L 47/822* (2013.01)

(58) Field of Classification Search
CPC ..... H04L 47/18; H04L 43/16; H04L 43/0858; H04L 47/27
See application file for complete search history.

(56) References Cited

U.S. PATENT DOCUMENTS

| | | | |
|---|---|---|---|
| 2004/0064577 A1* | 4/2004 | Dahlin | H04L 29/06 709/235 |
| 2006/0098681 A1* | 5/2006 | Cafiero | H04L 12/4625 370/445 |

(Continued)

*Primary Examiner* — Omer S Mian
(74) *Attorney, Agent, or Firm* — Law Office of R. Alan Burnett, P.S

(57) ABSTRACT

Methods, apparatus and software for implementing enhanced data center congestion management for non-TCP traffic. Non-congested transit latencies are determined for transmission of packets or Ethernet frames along paths between source and destination end-end-nodes when congestion along the paths is not present or minimal. Transit latencies are similarly measured along the same source-destination paths during ongoing operations during which traffic congestion may vary. Based on whether a difference between the transit latency for a packet or frame and the non-congested transit latency for the path exceeds a threshold, the path is marked as congested or not congested. A rate at which the non-TCP packets are transmitted along the path is then managed as function of a rate at which the path is marked as congested. In one implementation, non-TCP traffic is managed by mimicking a Data Center TCP technique, under which the congestion marking status of the path is substituted as an input to a DCTP algorithm in place of the normally-used ECN-Echo flag input. The congestion window output by the DCTCP algorithm is then used to manage the rate at which non-TCP packets to be forwarded via the path are transmitted from a source end-node.

7 Claims, 7 Drawing Sheets

(56) References Cited

U.S. PATENT DOCUMENTS

2009/0161569 A1\* 6/2009 Corlett .................... H04L 43/08
370/252
2011/0211449 A1\* 9/2011 Attar ....................... H04L 47/34
370/235

\* cited by examiner

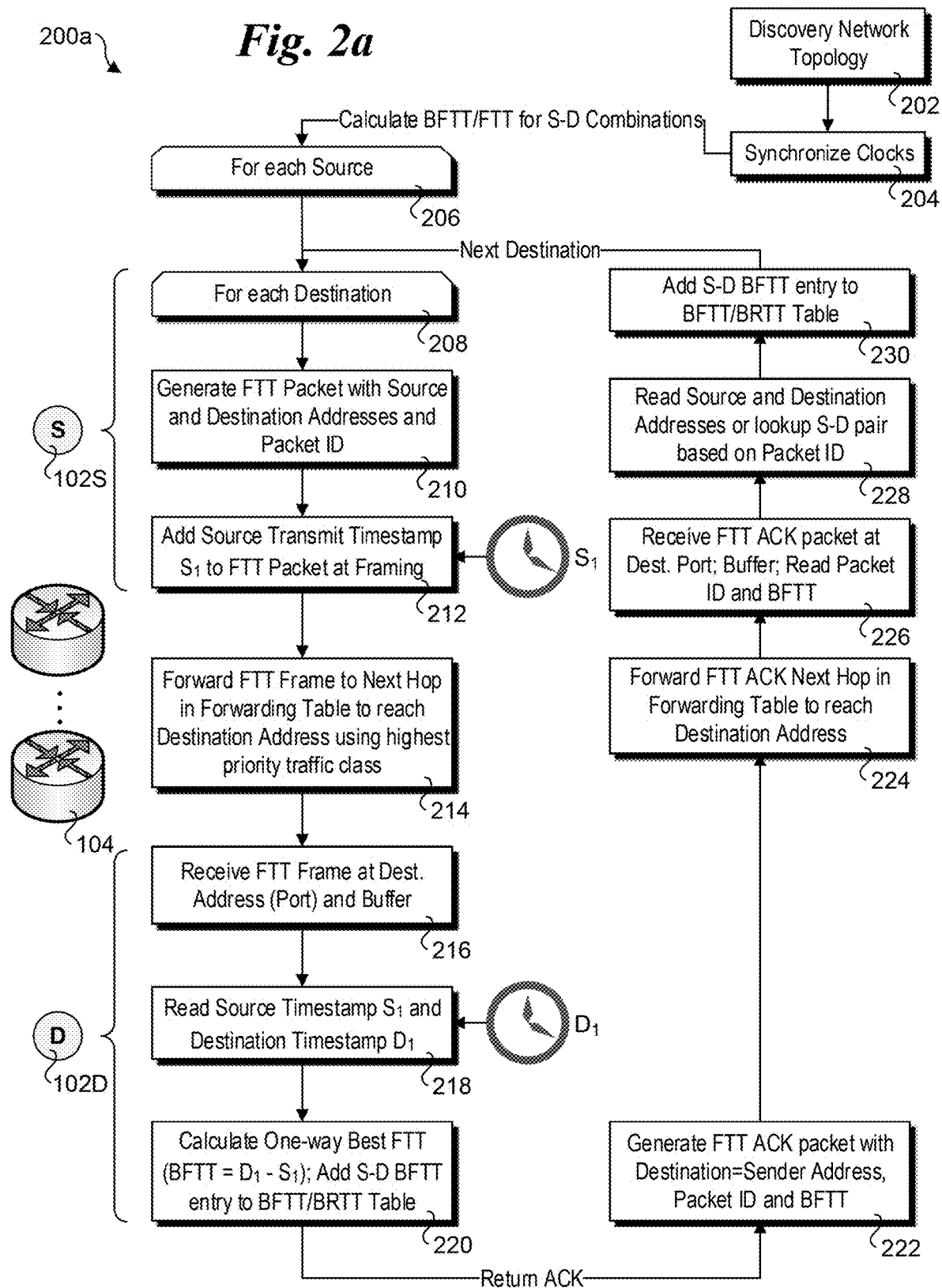

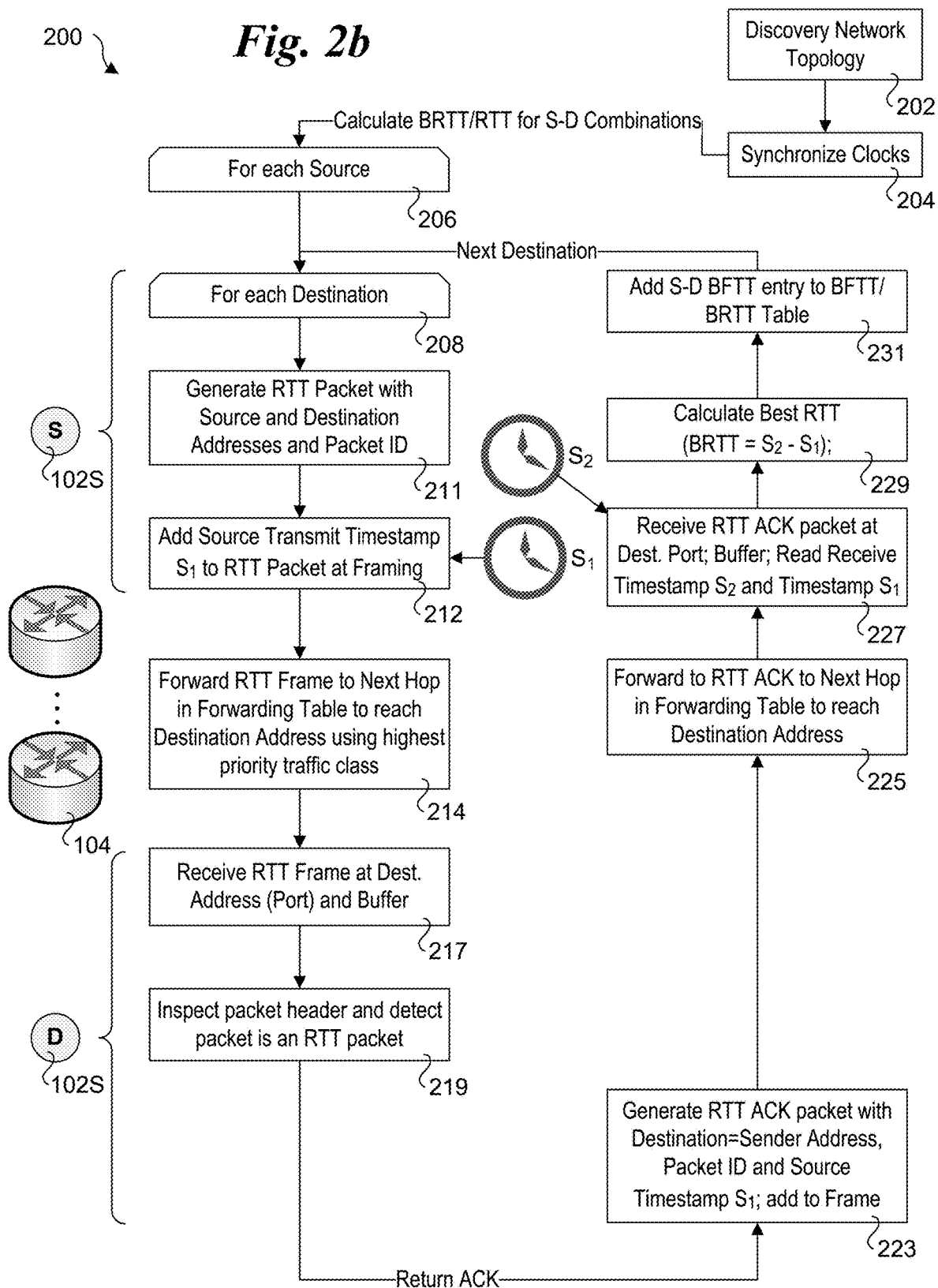

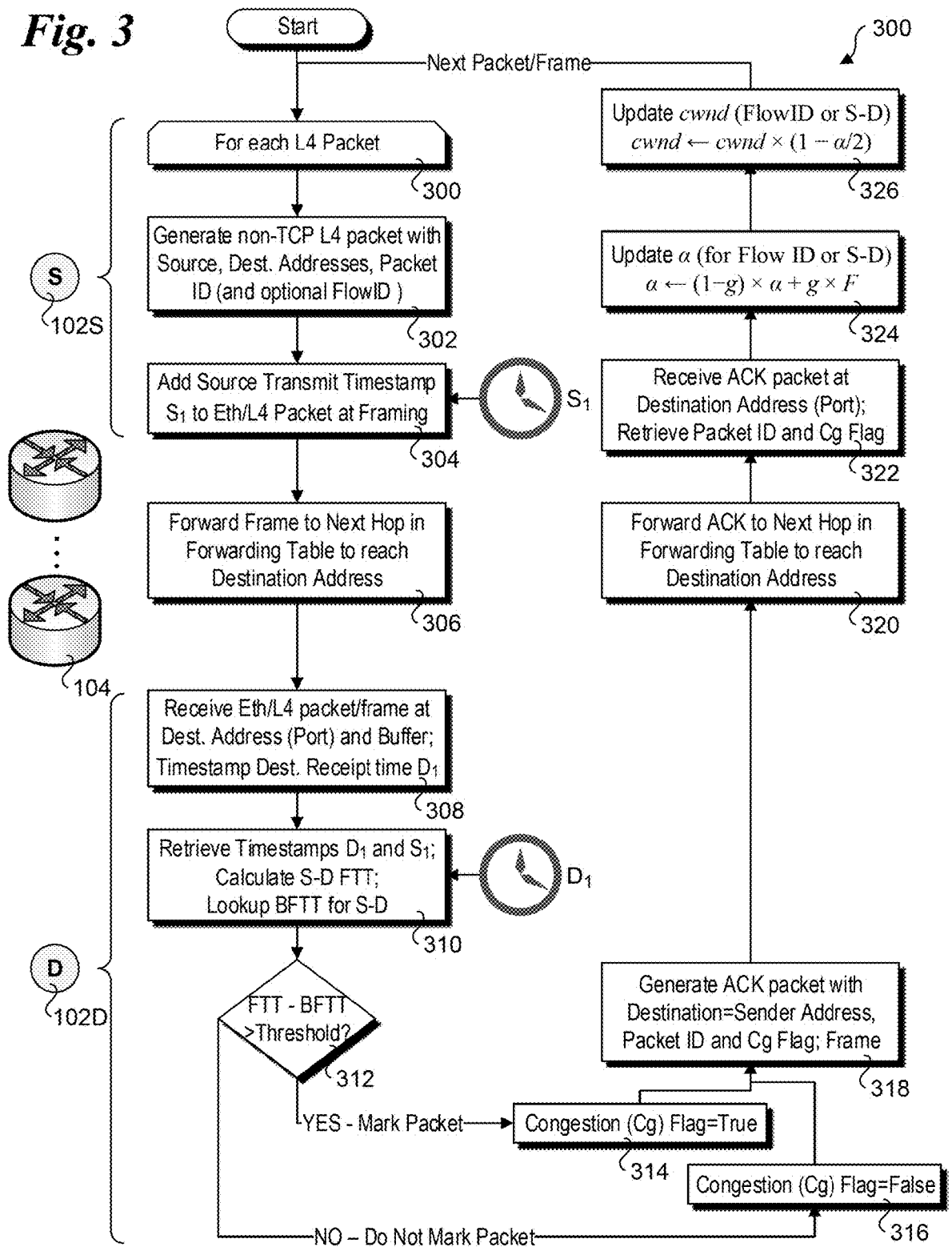

DATA CENTER CONGESTION MANAGEMENT FOR NON-TCP TRAFFIC

BACKGROUND INFORMATION

In recent years, implementation of "cloud-based" services, high-performance computing (HPC) and other activities employing data centers and the like have seen widespread adoption. Under a typical data center installation, a large number of servers installed in server chassis and server racks are interconnected in communication using network links (e.g., Ethernet) and various switching mechanisms, such as switch blades/modules and "top-of-rack" (ToR) switches. In some installations, additional links, such as InfiniBand or Fibre Channel, may used for storage and other purposes.

Performance of the network(s) within the data center can be impacted by congestion. During ongoing operations, applications running on compute nodes (typically hosted by physical servers and/or virtual machines, and also referred to as end-nodes, host nodes, or end hosts) send traffic to other applications using a "push" model under which a source node or host pushes traffic toward a destination node or host. Generally, network traffic is sent over Ethernet links using one or more upper layer protocols, such as TCP/IP (Transmission Control Protocol over Internet Protocol). At the Ethernet layer, data is transferred between network ports coupled to the compute nodes/hosts along forwarding paths that may be pre-determined or are dynamically selected based on real-time traffic considerations. Each link has a finite bandwidth, and when the bandwidth is reached, buffering of packets at the switches coupled to the links increase. As the buffers become filled, the network switches attempt to inform sources and/or other switches that the links are congested and that sending traffic toward the congested links should be backed-off. If applicable, the switches will also drop packets, which exacerbates the congestion problems since the dropped packets have to be resent for confirmed delivery protocols such as TCP.

TCP traffic beneficiates from a built-in end-to-end congestion management method that has been enhanced by several techniques. Data Center Transport Control Protocol (DCTCP) is the most recent and the most efficient congestion avoidance variant used in today's cloud data centers. It is a TCP-like protocol for data center networks that leverages Explicit Congestion Notification (ECN) in the network to provide multi-bit feedback to the end-nodes. Unfortunately, DCTCP is not relevant for non-TCP traffic like RDMA over Converged Ethernet (RoCE) or Fibre Chanel over Ethernet (FCoE).

Currently, there are several techniques for addressing congestion management of non-TCP traffic in data centers. For example, Quantized Congestion Notification (QCN) is a standardize method (defined by IEEE802.1Qau) for the network switches (a.k.a. congestion points—CP) to convey congestion notifications back to the source nodes (a.k.a. reaction points—RP). In reaction to the returned Congestion Notification Messages (CNM) the reaction point reduces the transmission rate for the concerned flow(s).

QCN relies on the congested switches or end station buffers to sample outgoing frames and to generate a feedback message (CNM) addressed to the source of the sampled frame. The feedback message contains information about the extent of congestion at the CP. Nominal sampling rate is 1% and it can grow up to 10% when the switch output buffers get very congested.

Unlike DCTCP, QCN relies on,
1) Sampled notifications—instead of systematic reports in DCTCP.
2) Feedback on overall congestion extent at the switch, for all flows altogether—instead of feedback on congestion extent for the specific (Layer4) flow.

As a result of this sampling approach, the returned QCN packets provide congestion reports on only a small fraction of the traffic sent. This fraction corresponds to the sampling rate at the switch port (1% to 10%) multiplied by the percentage of the offending L4 flow among all the traffic entering the switch port.

One result of the foregoing approach is that QCN induces much longer converging times for the QCN control loop than DCTCP. It makes QCN efficient only for long-lived data flows, which are generally not common when the data center links operate at 10 Gbps speed and higher. Also, QCN has tentatively addressed its inherent weaknesses by a greater rate decrease factor at the reaction points, which in return led to throughput penalties and longer recovery times at the source nodes. For these reasons, QCN is not performing well for 10 Gbps (and higher rates), and in any case, it is not performing as well as DCTCP.

In addition, since QCN is a Layer2 control protocol, it is limited within the Layer2 Ethernet cloud and it cannot extend beyond the IP subnet, as required for overlays/tunneled environments that carry an IP header while not including a TCP header. As defined by IEEE802.1Qau, QCN is designed to be a self-contained Layer2 solution, being agnostic to higher layer protocols such as FCoE, RoCE, etc.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2a is a flowchart illustrating operations performed by source and destination end-nodes to determine FTT (frame transmit time) and BFTT (best frame transmit time) for one-way source-to-destination transit time measurements, according to one embodiment;

FIG. 2b is a flowchart illustrating operations performed by source and destination end-nodes to determine RTT (roundtrip transmit time) and BRTT (best roundtrip transmit time) for round-trip source-to-destination and return to source transit time measurements, according to one embodiment;

FIG. 3 is a flowchart illustrating operations and logic performed by each end-node participating in a variation of a DCTCP algorithm implementation for managing non-TCP traffic using one-way FTT and BFTT measurements, according to one embodiment;

FIGS. 5a, 5b, and 5c are block diagrams showing alternative configurations for implementing network stack components configured to facilitate management of non-TCP traffic using a DCTCP algorithm, wherein FIG. 5a shows an Ethernet MAC layer implemented in software, FIG. 5b shows an Ethernet MAC layer implemented in hardware, and Figured 5c shows a split Ethernet MAC layer being implemented via a combination of software and hardware.

DETAILED DESCRIPTION

Figure 1:
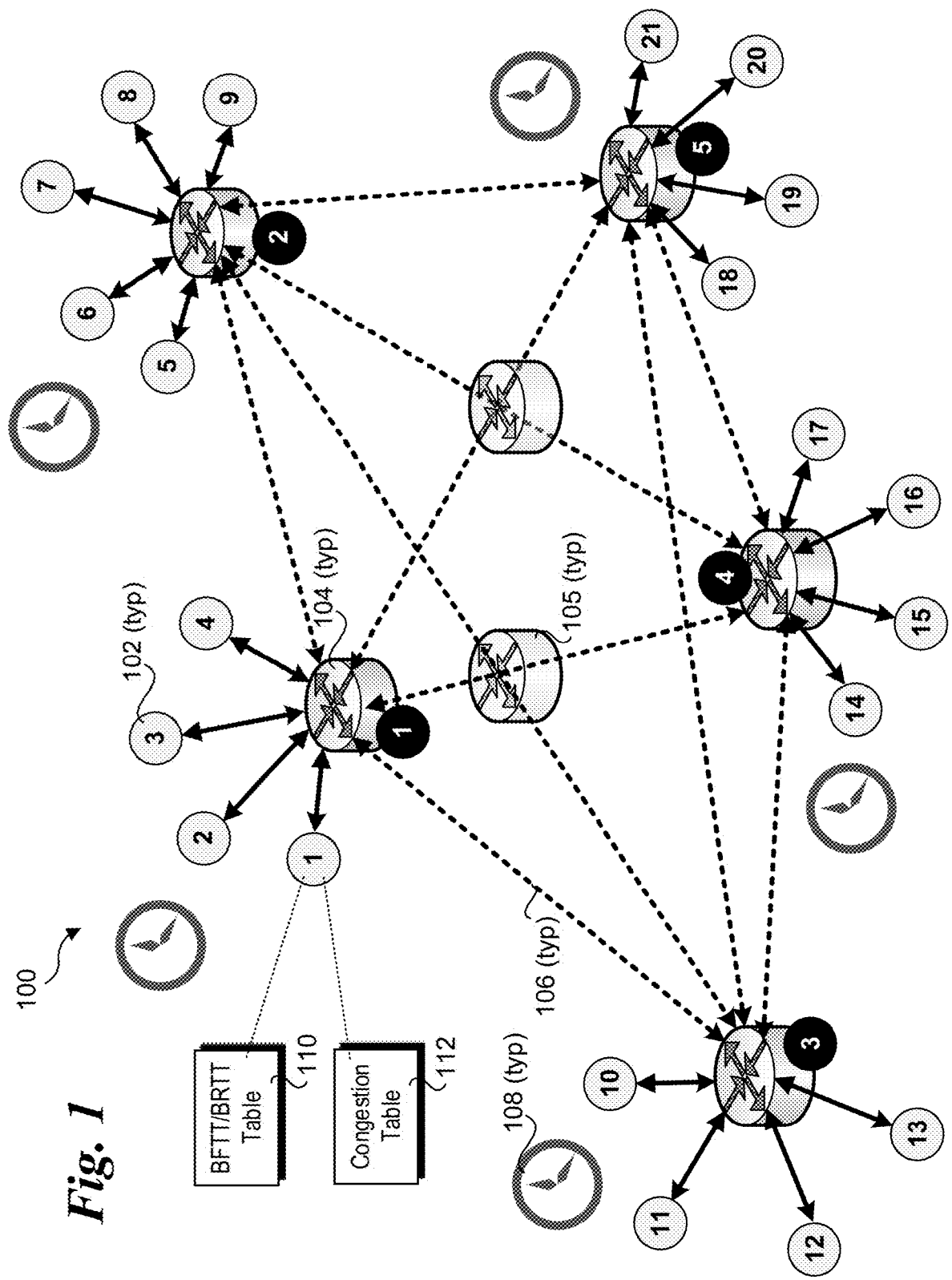
FIG. 1 is a schematic diagram of an exemplary implementation environment under which aspects of the embodiments disclosed herein may be employed to facilitate enhanced data center congestion management of non-TCP traffic.

Embodiments of methods, apparatus and software for implementing enhanced data center congestion management for non-TCP traffic are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with the embodiments described and illustrated herein, techniques are disclosed for enhancing data center congestion management of non-TCP traffic in cloud data centers and the like. In accordance with one aspect, the techniques are implemented in a manner that mimics the DCTCP algorithm for non-TCP protocols, which has been proven to provide an efficient end-to-end congestion management method. The techniques may be implemented for data center congestion management of non-TCP traffic such as FCoE and RoCE traffic, as well as other higher layer protocol traffic over IP with performance levels similar to that observed using DCTCP for TCP traffic.

In accordance with another aspect, the techniques are implemented solely at the end-nodes, without requiring any changes to the cloud data center switches. In this manner, the techniques work around a fundamental deficiency that Ethernet switches/routers are not configured to mark Ethernet frames carrying non-TCP traffic for congestion notification. Even if some marking technology for the non-TCP traffic will be implemented by next generation switches in the future, it is most-likely it will need to be implemented separately for each type of non-TCP protocol (e.g. RoCE, FCoE, etc.) and therefore it will take some time to replace the whole installed-base of data center switches. Under the embodiments herein, the approach requires only modification and/or upgrading of end-nodes. In some embodiments, as described below, the techniques may be implemented by only modifying the networking software for selected end-nodes in the data center. Moreover, only the end-nodes generating and receiving the non-TCP traffic need to be modified or upgraded, while other end-nodes that do not generate or receive non-TCP traffic are not modified.

FIG. 1 shows an exemplary implementation environment 100 under which aspects of the embodiments may be employed to facilitate enhanced data center congestion management of non-TCP traffic. Environment 100 is illustrative of a typical data center configuration under which a plurality of end-nodes 102 in a given rack are connected to a ToR edge switch 104 for the rack, with the ToR edge switches, in turn, being connected to one another, either directly, or via multi-hop paths that traverse one or more inner network switches 105 (a.k.a. "in the middle" switches). For example, a typical rack will have multiple server chassis, each containing one or more physical servers comprising the end-nodes. Each end-node 102 is connected to a ToR switch via an Ethernet link 106. Similarly, the ToR edge switches 104 are coupled to one another via Ethernet links 107. In addition to Ethernet, other existing and future communication links and protocols may be implemented in a similar manner.

Data centers typically use large numbers of commodity servers and switches. Under a common configuration, a ToR edge switch may support up to 48 or even 96 ports. Prior generation switches operated at a wire speed of 1 Gigabit per second (Gbps), while more recent switches operate at 10 Gbps, also known as 10 GE (10 Gigabit Ethernet). Some ToR edge switches may also support wire speeds of 40 Gbps and 100 Gbps in accordance with 40 GE and 100 GE protocols recently and currently being defined by the IEEE 802.3 working group. As a result of these higher wire speeds (and corresponding data transfer rates), the latencies traversing the links represent a very small portion of the latency for a given data transfer between end-nodes, with the bulk of the total transit latency representing latencies incurred at each switch. When the switch ports are congested, these latencies increase, adversely affecting the overall processing throughput of the data center.

As further depicted in FIG. 1, each end-node 102 employs an absolute clock 108 that is synchronized with the absolute clocks of the other end-nodes. Each end-node 102 also maintains or otherwise has access to a best frame transit time (BFTT) and/or best round trip transit time (BRTT) table 110, and a congestion table 112. BFTT/BRTT table 110 is illustrative of any combination of a BFTT and BRTT table, including separate BFTT and BRTT tables, as well as only a BFTT or a BRTT table. Congestion table 112 is used to store the most recent a and cwnd values for source-destination (S-D) paths used in a DCTCP algorithm used to mimic DCTCP for non-TCP traffic, as well as other DCTCP algorithm parameters, as described below.

In order to better understand how the embodiments mimic DCTCP for non-TCP traffic, a brief description of DCTCP, as it is conventionally implemented, is in order. Details of DCTCP operation are described in "Data Center TCP (DCTCP)," authored by Alizadeh, et al., presented at SIGCOMM 2010 in New Delhi, India. The DCTCP algorithm has three main components: 1) Simple Marking at the Switch; 2) ECN-Echo at the Receiver; and 3) Controller at the Sender. It also is implemented at both the source and destination end-nodes (Senders and Receivers, respectively) and the switches.

DCTCP employs a simple active queue management scheme. There is only a single parameter, the marking threshold, K. An arriving packet is marked with the Congestion Experienced (CE) codepoint if the queue occupancy is greater than K upon its arrival. Otherwise, it is not marked. This scheme ensures that sources are quickly notified of the queue overshoot (that is, the currently queue length (fill level) exceeding a threshold).

The only difference between a DCTCP receiver and a TCP receiver is the way information in the CE codepoints is conveyed back to the sender. RFC 3168 states that a receiver sets the ECN-Echo flag in a series of ACK packets until it receives confirmation from the sender (through the CWR flag) that the congestion notification has been received. A DCTCP receiver, however, tries to accurately convey the exact sequence of marked packets back to the sender. The simplest way to do this is to ACK every packet, setting the ECN-Echo flag if and only if the packet has a marked CE codepoint.

However, using Delayed ACKs is important for a variety of reasons, including reducing the load on the data sender. To use delayed ACKs (one cumulative ACK for every m consecutively received packets), the DCTCP receiver uses a simple two state state-machine to determine whether to set the ECN-Echo bit. The states correspond to whether the last received packet was marked with the CE codepoint or not. Since the sender knows how many packets each ACK covers, it can exactly reconstruct the runs of marks seen by the receiver.

The sender maintains an estimate of the fraction of packets that are marked, called a, which is updated once for every window of data (roughly one RTT) as follows:

$$a \leftarrow (1-g) \times a + g \times F \qquad (1)$$

where F is the fraction of packets that were marked in the last window of data, and 0<g<1 is the weight given to new samples against the past in the estimation of a. Given that the sender receives marks for every packet when the queue length is higher than K and does not receive any marks when the queue length is below K, Equation (1) implies that a estimates the probability that the queue size is greater than K. Essentially, a close to 0 indicates low levels of congestion, and a close to 1 indicates high levels of congestion.

The only difference between a DCTCP sender and a TCP sender is in how each reacts to receiving an ACK with the ECN-Echo flag set. While conventional TCP always cuts it's congestion window size (cwnd) by a factor of 2 in response to a marked ACK, DCTCP uses a as follows:

$$cwnd \leftarrow cwnd \times (1-a/2) \qquad (2)$$

Thus, when a is near 0 (low congestion), the window is only slightly reduced. In other words, the DCTCP senders start gently reducing their window as soon as the queue exceeds K. This is how DCTCP maintains low queue length, while still ensuring high throughput. When congestion is high (a=1), DCTCP cuts it window in half, just like conventional TCP.

In accordance with embodiments herein, timestamping at the end-nodes and corresponding path congestion determination and marking is used in place of marking at the switches. This technique assumes a well-synchronized absolute time (a.k.a., real-time) that is shared across the data center end-nodes. Such absolute time synchronizing can be achieved using one of multiple well-known techniques, such as using existing TimeSync protocols in one embodiment.

Under one embodiment, every non-TCP frame is timestamped by the source node with the absolute time at which it was issued to the network, referred to as the source transmit timestamp. For one-way S-D paths, the destination end-node computes the Frame Transit Time (FTT) by subtracting the source transmit timestamp from the time at which it receives the frame (the destination receive timestamp). If the FTT computed by such is greater than the Best Frame Transit Time (BFTT) measured for the S-D path (plus a configurable offset to filter out delay variations that are not due to buffer congestion), the frame is assumed to been delayed somewhere in the network along the S-D path, and thus to have encountered congestion. Under this approach, the destination end-node knows exactly which frame has encountered congestion and which frame has not, yielding a similar result to that achieved by ECN marking for DCTCP.

Under alternative embodiments, either one-way source-to-destination transit time measurements, or roundtrip transit time measurements for source-destination-source roundtrips are used. Additionally, some implementations may combine use of both one-way and roundtrip transit time measurements.

FIG. 2a shows a flowchart 200 illustrating operations performed by end-nodes to determine FTT and BFTT for one-way source-to-destination transit time measurements, according to one embodiment. At some prior point in time, network topology is discovered in a block 202. This may be accomplished using one of many well-known network topology discovery schemes; accordingly, further details are not provided herein, as such techniques are known to those having skill in the networking arts. Depending on the particular implementation, network topology discovery may be performed during an initialization operation for one or more racks, or may be performed dynamically when a server chassis and/or servers in the server chassis is/are brought on-line or a hot-swap server chassis is installed in a rack and brought on-line. To support dynamic discovery of network topology, network topology information may be stored by a management entity, which monitors the topology and provides updates, as applicable, to the various end-nodes in the topology. Optionally, a new server or set of servers in a server chassis may broadcast its/their presence and exchange discovery packets with their neighbors to discover the network topology and to spread new topology configuration information to other end-nodes and switches in the network.

In a block 204, the absolute clocks (e.g., real-time clocks) of the end-nodes participating in the scheme are synchronized, as discussed above. As before, this may involve synchronization of a larger number of servers during initiation of those servers, or may involve in incremental synchronization of a new server or a set of servers in a server chassis that is brought on-line or is hot-swapped.

Once the clocks are synchronized, the FTT and/or BFTT for one-way source-destination paths between source and destination end-nodes may be calculated. In one embodiment, the illustrated operations are performed for each end-node participating in the scheme, as depicted in a start loop block 206. Generally, an S-D path BFTT may be e.g., using one or more of the methods listed in the following paragraph. As depicted by a start loop block 208, the operations for a given source end-node are performed for each source and destination end-node participating in the scheme or otherwise each destination end-node a given source end-node may send non-TCP traffic to.

Generally, BFTT measurements may be made using one or more of the following:
1. Over a TC (Traffic Channel) that has the highest priority service over the network;
2. During hours where the datacenter is known to have low congestion, such as during nights or weekends, noting this may not apply to some datacenters;

3. Compute BFTT periodically and select the smallest value measured over a certain period where it is assumed the network physical path between the two nodes is not modified.
4. Use a topology info that provides the number of hops between the S-D and the link speed between nodes. A dedicated control packet can be sent between S-D to get this info collected and appended to the packet by every node in the path. Then assume a typical delay per hop, and a typical cable length.
5. Any combination of the foregoing methods can be envisaged too, but a method that makes use of the highest priority TC is preferred.

In a block 210, a source end-node 102S generates an FTT packet with its network protocol address as the Source address, and the destination's network address as the Destination address. Generally, the Source and Destination addresses may depend on the particular protocol being used. For example, in embodiments, where higher-layer protocol (e.g., Layer4) traffic is sent over Ethernet, the Source and Destination addresses may correspond to those used by the higher-layer protocol. A packet identifier (ID) is also included to uniquely identify the packet, such as a sequence number. Optionally, Ethernet Media Access Channel (MAC) Source and Destination addresses may be used.

Just prior to sending each packet from source end-node 102S onto the link (a.k.a. "wire") toward its ToR edge switch 104, the packet will be encapsulated in an Ethernet packet, which is then inserted into an Ethernet frame to be transmitted as part of a sequence of Ethernet frames. In conjunction with this framing operation, a source transmit timestamp $S_1$ is added, as depicted in a block 212. Optionally, a source transit timestamp may be added earlier; however, at whatever processing stage the timestamp is added should be consistent across end-nodes. For example, in an embodiment under which only networking software is being modified, the timestamps will be added by the software prior to dispatching packets to an Ethernet network adaptor or Ethernet network interface controller (NIC) or other network interface component. Optionally, a modification can be made to firmware (embedded software) on the network interface component to add a timestamp.

Generally, the timestamping information can be added to every packet or frame by either the insertion of a new proprietary end-to-end header, or by making use of existing timestamping protocols and/or existing header fields. One drawback of employing extra headers is deep packet inspection of corresponding packets (containing the extra headers) by some inner network legacy switches and/or routers may be prevented. In one embodiment the Congestion Notification Tags (CN-TAG) of the QCN protocol is repurposed for storing timestamp values, as these tags are tolerated by QCN-enabled networking equipment that is generally the equipment used in data center clouds to convey non-TCP traffic. In one embodiment, the 16-bit QCN field of the CN-TAG is filled with a sub-microsecond accurate timestamp. Optionally, a portion of the QCN field is used for storing the timestamp.

As depicted in a block 214 and ToR edge switches 104, as each switch along the forwarding path to the destination receives the FTT frame, it performs a lookup of the destination address in a lookup table and forwards the packet/frame to the next hop along the path using the highest priority traffic class that is available. Generally, forwarding may be performed using either Layer2 or Layer3 routing. In the simplest forwarding case, both a source and destination end-node may be linked to the same ToR edge switch. At a next level, the forwarding path will traverse a pair of ToR edge switches without any inner network switches. A more complex forwarding path may further traverse one or more inner network switches. Under any of the cases, the ToR edge switches and inner switches generally will be agnostic to any changes made to the packet/frame headers, except for embodiments employing new headers in combination with switches that perform operations such as deep packet inspection, as described above.

The source transmit timestamped FTT frame is forwarded in the foregoing manner until it is received at the network port associated with the Destination address of destination end-node 102D and buffered, as shown in a block 216. In one embodiment under which a one-way BFTT is measured, the source transmit timestamp $S_1$ is read from the frame, while a destination receive timestamp $D_1$ is read from destination end-node 102D's real-time clock, as depicted in a block 218. The one-way BFTT is then calculated in a block 220 by measuring the difference between the destination receive and source transmit timestamps $D_1$ and $S_1$, and a corresponding entry is added to FBTT/FRTT table 110 corresponding to the BFTT for the Source-Destination pair.

The next set of operations depicted on the right-hand side of flowchart 200 relate to use of an FTT ACK packet/frame that is returned from the destination end-node 102D to source end-node 102S. In a block 222, an FTT ACK packet/frame is generated swapping the original Source and Destination addresses, and including the packet ID and the BFTT.

As before, the FTT ACK packet/frame is forwarded via one or more switches 104 and inner switches 105 (as applicable) toward the original source end-node 102S, as depicted in a block 224. Subsequently, the FTT ACK packet/frame is received and buffered in a block 226, and the packet ID and BFTT are read. In a block 228 the Source and Destination addresses are read, or a lookup of the S-D pair is performed based on the Packet ID. An S-D BFTT entry is then added to BFTT/BRTT table 110 for embodiments employing a local BFTT/BRTT table 110 for the end-nodes. Optionally, a BFTT/BRTT table may be shared and accessed by multiple end-nodes. The logic then loops back to block 208 to measure the BFTT between source end-node 102S and another destination end-node.

FIG. 2b shows a flowchart 200b illustrating operations and logic for determining a BRTT, according to one embodiment. In flowcharts 200a and 200b, like-numbered blocks perform similar operations. As in flowchart 200a, the loop operations are performed for each destination to which each a participating source end-node may be sending non-TCP traffic.

In a block 211, source end-node 102S generates an RTT packet with Source and Destination addresses and a Packet ID. This packet is similar to the FTT packet generated in block 210 in flowchart 200a, except it is processed as an RTT packet rather than an FTT packet. As before, a Source transmit timestamp $S_1$ is added to the packet/frame during framing or during a prior operation proximate to framing. The Ethernet frame is then forwarded along an applicable S-D path in block 214 to reach destination end-node 102D.

Upon receipt at destination end-node 102D, the RTT packet/frame is buffered in a block 217, the packet header is inspected in a block 219, and the packet is recognized as an RTT packet, resulting in an RTT ACK packet being generated in a block 223 that is addressed so that it is returned to source end-node 102S. As with the BTT ACK packet, the RTT ACK packet includes the packet ID; however, rather than a BTT, the RTT ACK packet includes Source transmit timestamp $S_1$.

The RTT ACK packet is framed and forwarded along the reverse path from destination end-node 102D to source end-node 102S, traversing one or more switches, as depicted by block 225. In a block 227 the RTT ACK packet/frame is received at the destination port (of source end-node 102S) and buffered. A source receive timestamp $S_2$ corresponding to the time the ACK packet/frame is received (or subsequently processed if the timestamps are marked by networking software rather than the Ethernet network interface component) is read from source end-node 102S's real-time clock, while Source transmit timestamp S1 is read from the RTT ACK packet.

The BRTT corresponding to the time required for the RTT packet/frame to be sent from source end-node 102S to destination end-node 102D and returned is calculated in a block 229 by measuring the difference between the source transmit and receive timestamps $S_2$ and $S_1$, preferably during a period of low congestion along the roundtrip S-D path. The BRTT is then added to BFTT/BRTT table 110 in a block 231 as the BRTT entry for the Source-Destination Pair corresponding to source end-node 102S and destination end-node 102D.

As discussed above, ideally, the BFTT/BRTT calculation (s) would be performed when there is relatively low-level of traffic through the switch ports used along the forwarded path, such that the BFTT/BRTT reflects actual best Source-Destination transfer times and round-trip times. However, this may not be possible, especially for situations under which BFTT/BRTT's are calculated while there are existing congestion levels along the forwarding paths. In one embodiment, if the switches support quality of service (QoS) or other service class differentiation, the highest available service class/priority level is used for sending the FTT or RTT packet/frame from the source end-node to the destination end-node. Under some traffic class schemes, ACKs are assigned as low priority traffic, which may adversely affect BRTT calculations (if the ACKs are delayed in favor of higher priority traffic). Depending on the congestion level, it may be advisable to only employ one-way BTT values. In addition, FTT and/or RTT measurements may be measured multiple times, with the lowest transit times being stored as the BFTT and/or BRTT values.

Once BFTT/BRTT table 110 is populated with BFTT and/or BRTT entries for the participating destination end-nodes for a given source end-node, a timestamp-based path congestion-marking implementation of the DCTCP algorithm proceeds as follows. In one embodiment, FTT and BFTT values are used, as depicted by a flowchart 300 in FIG. 3. Alternatively, RTT and BRTT values may be used, as depicted in a flowchart 400 of FIG. 4. Generally, the same timestamping process is used for measuring FTT/BFTT values in flowcharts 200a and 300, and for measuring RTT/BRTT values in flowcharts 200b and 400.

Proceeding to flowchart 300 of FIG. 3, the illustrated operations and logic are performed by each end-node participating in the non-TCP mimicked DCTCP implementation. As depicted by a start loop block 300, the following loop operations are performed for each non-TCP L4 packet on an ongoing basis. In a block 302, a non-TCP L4 packet with Source and Destination addresses, and packet ID is generated. For example, the L4 packet might include an RoCE packet, an FCoE packet, a non-TCP L4 packet over IP, etc. In a block 304, a source transit timestamp S1 is added to the L4 packet at framing (or at an earlier point during outbound packet processing). The frame is then forwarded along the applicable forwarding path to destination end-node 102D, as shown in a block 306.

Upon receipt, the L4 packet/frame is buffered and a destination receive timestamp $D_1$ is associated with the frame and/or packet (encapsulated in the frame). In a block 310, the Destination receive and Source transmit timestamps $D_1$ and $S_1$ are retrieved (e.g., $S_1$ may be read from an applicable packet header field). Optionally, $S_1$ can be read from the packet and $D_1$ read from destination end-node 102D's real-time clock. The Source-to-Destination FTT is then determined, and the BFTT for the S-D path is looked up in BFTT/BRTT table 110.

In a decision block 312, a determination is made to whether the difference between the L4 packet FTT and the BFTT for the Source-Destination path exceeds a threshold. This FTT–BFTT time difference is used as an indicia that mimics the queue level used by the conventional DCTCP algorithm, wherein the larger the difference the greater the latency incurred during transport of the L4 packet. Preferably, this threshold should take into account the number of hops along the S-D path to better mimic the DCTCP algorithm. In DCTCP, every switch in the path decides whether to mark the packet if it encounters a certain level of queuing occupancy locally. Accordingly, in one embodiment techniques are implemented to reproduce such a queuing delay tolerance per each switch encountered along the S-D path.

If the L4 packet FTT–BFTT exceeds the threshold, a congestion (Cg) flag in a packet header field is marked as True (e.g., set to '1'), as depicted in a block 314. This is analogous to marking the ECN-Echo flag under DCTCP. Generally, if the L4 packet does not employ IP, a header field or flag may be repurposed to implement the Cg flag. For implementations over IP, the ECN-Echo flag scheme for IP may be used. If the answer to decision block 312 is NO, the applicable packet header flag is not marked (e.g., set to '0' or congestion=False), as depicted in a block 316.

Continuing at a block 318, an ACK packet is generated with the Source and Destination addresses swapped and including the Packet ID and Cg flag value. Optionally, the ACK packet can include the FlowID. The ACK packet is then framed and forwarded back to source end-node 102S, as shown in a block 320. Upon receipt in a block 322, the ACK packet is buffered, and the Packet ID and Cg flag values are retrieved. If the ACK packet includes a FlowID, this value may also be retrieved.

In a block 324, the DCTCP a is updated in accordance with Equation (1) above, using either a FlowID or S-D pair basis. This is similar to what is done using the existing DCTCP algorithm, with the Cg flag value used in place of the ECN-Echo flag (again noting the ECN-Echo flag may be used if IP is used for Layer3). Also, in a manner similar to the DCTCP algorithm, the Congestion Window cwnd is updated using the updated a value in accordance with Equation (2) above, as shown in a block 326.

Figure 4:
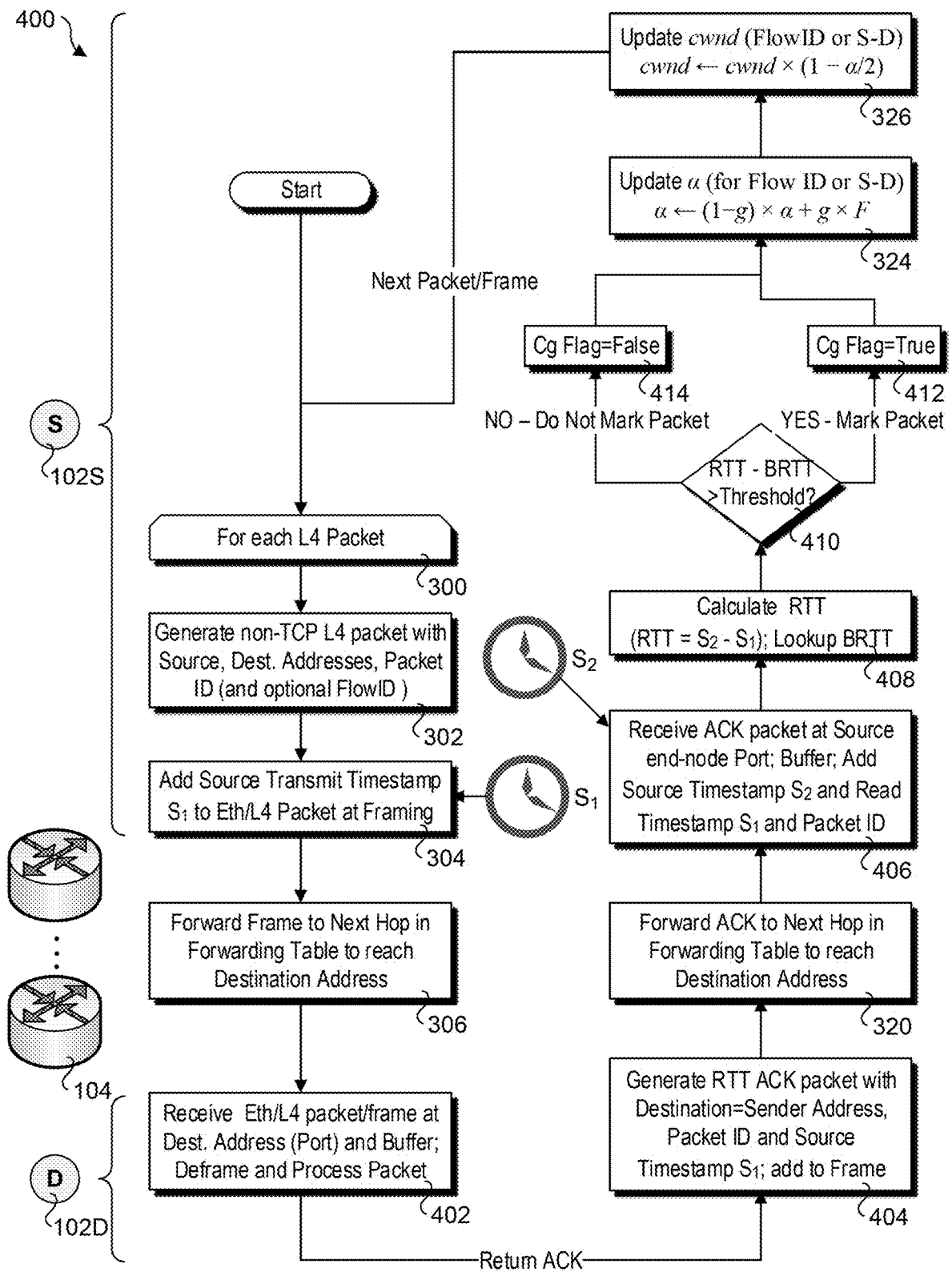
FIG. 4 is a flowchart illustrating operations and logic performed by each end-node participating in a variation of a DCTCP algorithm implementation for managing non-TCP traffic using roundtrip RTT and BRTT measurements, according to one embodiment.

In a similar manner to that illustrated in flowchart 300 of FIG. 3 for marking the Cg flag using the difference between FTT and BFTT values, the Cg flag may be marked using RTT and BRTT values, as illustrated in flowchart 400 of FIG. 4. Under the RTT/BRTT approach, timestamp measurements are only performed at the source end-node, with the destination end-node merely performing ACKs in the normal manner ACKs are used for the given L4 protocol (or IP layer). As before, the loop operations are performed for each non-TCP L4 packet transmitted from source end-node 100S. As indicated by the same reference numbers for blocks 300, 302, 304, and 306 in both flowcharts 300 and 400, these operations are similar whether an FTT or RTT scheme is being implemented. Also, it is noted that the destination node (as depicted by destination end-node 102D) does not need to be modified to support the RTT/BRTT scheme, although in some embodiments it may, as described in further detail below.

Upon receipt of the non-TCP L4 packet/frame at the receive port of destination end-node 102D, conventional packet-processing operations are performed in a block 402, which include buffering, deframing, decapsulation, header inspection, etc. In conjunction with these processes, an ACK packet is generated in a block 404 under which the Source and Destination addresses are swapped and including the packet ID and source transmit timestamp $S_1$. The ACK packet is then framed and added to the outbound frame stream, and the frame is forwarded by the applicable switch(es) in a block 320 to return the ACK packet to source end-node 102S.

Various forms of ACKs are used to confirm delivery of packets under reliable transport protocols, with the most common ACK scheme used in TCP. The non-TCP protocols used by embodiment herein employ similar, but not identical ACK schemes as TCP. An aspect of these ACK schemes is that to save bandwidth, a single ACK packet (a.k.a. ACK message) may confirm delivery for multiple received packets. However, this creates a potential problem for the RTT/BRTT scheme, as delaying the return of an ACK could create an illusion that there is greater latency incurred along the transport path than the actual latency. This can be handled in the following manner. Under one embodiment, when an ACK is for multiple received packets, the timestamps used are for the last packet that was transmitted for the multiple packets. In this case, the ACK packet generated in block 404 corresponds to the source timestamp S1 for the last packet received in block 404, while the Packet ID will generally comprise packet identification information for all of the received packets for which the ACK applies, such as a range of sequence numbers. The use of sequence numbers or the like is conventional practice, and this approach does not require any modification to the destination end-node.

Under an alternative approach, the destination end-node is aware of the RTT/BRTT scheme (and has been configured to support the scheme). Under one embodiment, the destination end-node returns an ACK for each packet. Optionally, certain packets may be marked as being RTT packets (e.g., via a QCN Tag protocol identified (TPID) value, and the destination end-node detects this and returns an ACK for each one of these packets.

Continuing at a block 406, the ACK packet/frame is received at the receive port of source end-node 102S, deframed, and buffered. A source receive timestamp $S_2$ is then added or otherwise associated with the packet ID, which is read along with the earlier source transmit timestamp $S_1$. In a block 408, the RTT is calculated as the difference between the $S_2$ and $S_1$ timestamps.

The remaining operations depicted in a decision block 410 and blocks 314, 316, 324 and 326 are similar to respective operations in decision block 312 and blocks 313, 316, 324, and 326 of flowchart 300, with the difference being the threshold determination in decision block 410 is based on the difference between the RTT value calculated in block 408 and the BRTT for the S-D pair (or FlowID) rather than the FTT and BFTT values used in flowchart 300. As a result, the DCTCP a and cwnd values are updated in blocks 324 and 326 on an ongoing basis using the RTT and BRTT measurements.

Generally, existing protocol components may be modified to implement aspects of the embodiments herein to facilitate DCTCP-like congestion management for non-TCP traffic. Depending on the implementation, the protocol component modification may only involve modification to network software components (e.g., network stack and/or network drivers), modification to hardware components (e.g., in an Ethernet Adaptor or NIC), or a combination of the two.

Figure 5A:
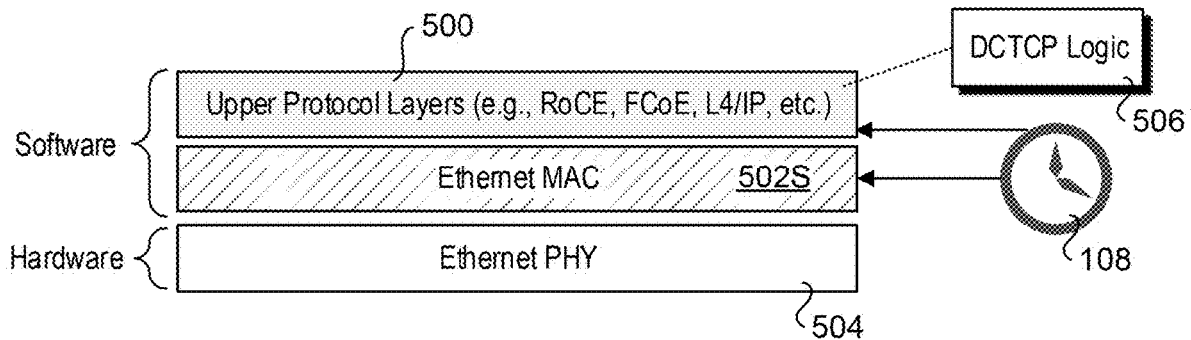
Figure 5B:
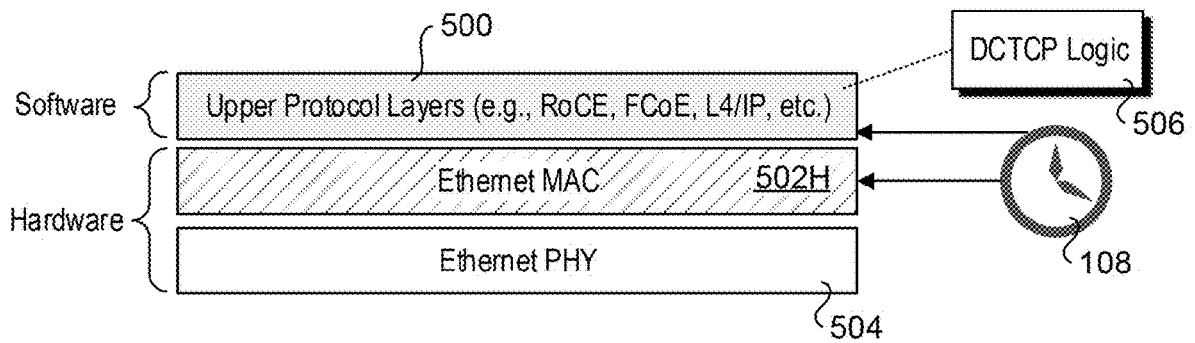
Figure 5C:
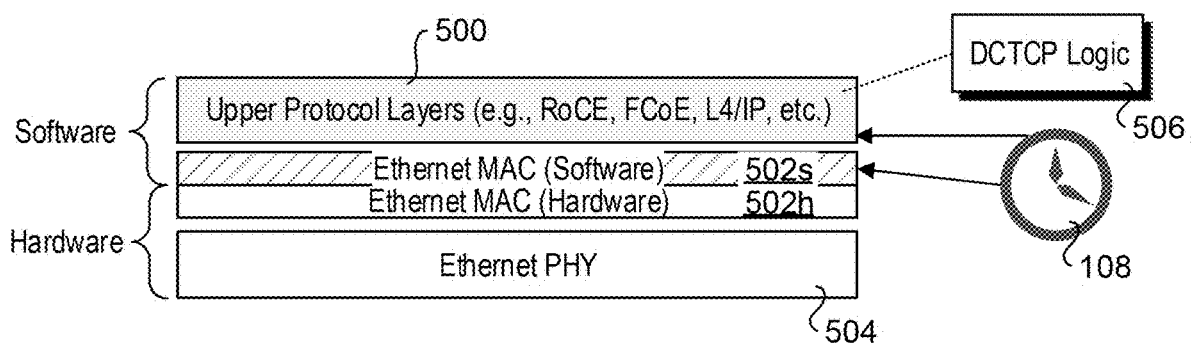

For example, FIGS. 5a, 5b, and 5c illustrate exemplary implementations under which selected software and/or hardware components are modified to facilitate DCTCP-like congestion management for non-TCP traffic. Under the configuration show in FIG. 5a, layers above an Ethernet Physical Layer (PHY) 504 are implemented in software, including the upper protocol layers 500 (e.g., RoCE, FCoE, L4/IP, etc), and a software-based Ethernet MAC layer 502S. Under the embodiment of FIG. 5b, the Ethernet MAC layer 502H is implemented in hardware. Under the embodiment of FIG. 5c, the Ethernet MAC layer is split between a software Ethernet MAC sub-layer 502s and a hardware Ethernet MAC sublayer 502h. In each of the embodiments, Ethernet PHY 504 is implemented in hardware, e.g., in the Ethernet adaptor or NIC or other Ethernet network interface component. Generally, the particular Ethernet PHY that is used (e.g., 10 GE, 40 GE, 100 GE, etc.) is independent of the higher layers. As shown below in FIG. 6, a reconciliation layer may be implemented between the Ethernet PHY and the MAC layer.

As termed herein, an Ethernet component that is implemented in hardware means the corresponding functionality is not implemented in software running on the end-node host processor, such as an operating system (OS) networking driver. It will be understood that even though all or part of an Ethernet MAC layer depicted as being implemented in hardware may actually be implemented via embedded software running on hardware device, this is still referred to as a hardware-based Ethernet MAC layer.

As illustrated in FIGS. 5a, 5b, and 5c, a light gray background indicates a layer is modified, while a white background indicates an unmodified layer. A cross-hatched background means the layer may or may not be modified, depending on the implementation.

In each of the embodiment of FIGS. 5a, 5b, and 5c, one or more upper protocol layers 500 have been modified to implement an embodiment of the transit latency-based modified DCTCP algorithm as described herein, as depicted by DCTCP logic 506. Depending on what phase of packet processing timestamping is implemented, there may or may not be modification to Ethernet MAC layers 502S, 502H, or 502s. For example, in some embodiments, timestamping may be implemented in a layer above the Ethernet layer, in which case the Ethernet layer software and/or hardware (as applicable) will not be modified, at least with respect to timestamping. For example, an existing higher-layer header field could be repurposed to store timestamps, or a new protocol header could be implemented. Optionally, such as for embodiments using the modified QCN field for storing timestamps, the timestamping operation will be implemented at the Ethernet MAC layer. For hardware-based Ethernet MAC layers, this may be implemented by modifying the embedded software or embedded logic for implementing the Ethernet MAC layer functionality. In the split Ethernet MAC layer configuration of FIG. 5c, in one embodiment Ethernet MAC software sublayer 502s is modified, while Ethernet MAC hardware sublayer 502h is not. Optionally, timestamping may be implemented in Ethernet MAC hardware sublayer 502h, without modification to Ethernet MAC software sublayer 502s (not shown).

Figure 6:
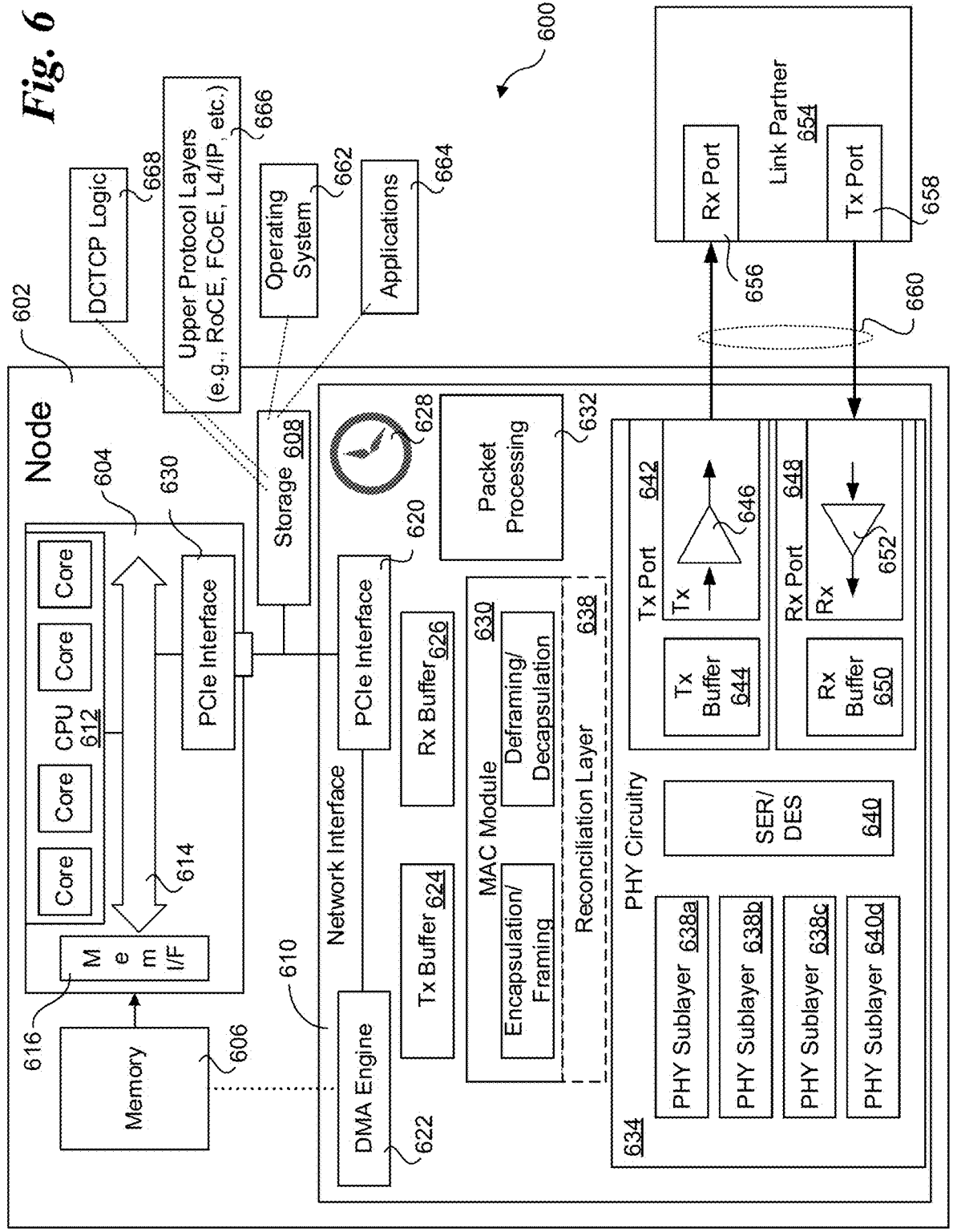
FIG. 6 is a block schematic diagram of an end-node architecture configured to facilitate aspects of source and destination end-node operations in accordance with embodiments disclosed herein.

FIG. 6 is a block schematic diagram of an exemplary server end-node (node) 600 that may be used to implement aspects of the embodiments disclosed herein. In one embodiment, node 600 comprises a server blade or server module configured to be installed in a server chassis. The server blade/module includes a main board 602 on which various components are mounted, including a processor 604, memory 606, storage 608, and a network interface 610. Main board 602 will generally include one or more connectors for receiving power from the server chassis and for communicating with other components in the chassis. For example, a common blade server or module architecture employs a backplane or the like including multiple connectors in which mating connectors of respective server blades or modules are installed.

Processor 604 includes a CPU 612 including one or more cores. The CPU and/or cores are coupled to an interconnect 614, which is illustrative of one or more interconnects implemented in the processor (and for simplicity is shown as a single interconnect). Interconnect 614 is also coupled to a memory interface (I/F) 616 and a PCIe (Peripheral Component Interconnect Express) interface 618. Memory interface 616 is coupled to memory 606, while PCIe interface 618 provides an interface for coupling processor 604 to various Input/Output (I/O) devices, including storage 608 and network interface 610. Generally, storage 608 is illustrative of one or more non-volatile storage devices such as but not limited to a magnetic or optical disk drive, a solid state drive (SSD), a flash memory chip or module, etc.

Network interface 610 is illustrative of various types of network interfaces that might be implemented in a server end-node, such as an Ethernet network adaptor or NIC. Network interface 610 includes a PCIe interface 620, a Direct Memory Access (DMA) engine 622, a transmit buffer 624, a receive buffer 626, and real-time clock 628, a MAC module 630, and a packet processing block 632. Network interface 610 further includes PHY circuitry 634 comprising circuitry and logic for implementing an Ethernet physical layer. Also depicted is an optional reconciliation layer 634.

PHY circuitry 634 includes a set of PHY sublayers 638a-d, a serializer/deserializer (SERDES) 640, a transmit port 642 including a transmit buffer 644 and one or more transmitters 646, and a receive port 648 including a receive buffer 650 and one or more receivers 652. Node 600 is further illustrated as being linked in communication with a link partner 654 including a receive port 656 and a transmit port 658 via a wired or optical link 660. Depending on the particular Ethernet PHY that is implemented, different combinations of PHY sublayers may employed, as well as different transmitter and receiver configurations. For example, a 10 GE PHY will employ different PHY circuitry that a 40 GE or a 100 GE PHY.

Various software components are executed on one or more cores of CPU 612 to implement software-based aspects of the embodiments, such as described above with reference to FIGS. 5a, 5b, and 5c. Exemplary software components depicted in FIG. 6 include a host operating system 662, applications 664, upper protocol layer software 666, and software instructions for implementing DTCTP logic 668. All or a portion of the software components generally will be stored on-board the server node, as depicted by storage 608. In addition, under some embodiments one or more of the components may be downloaded over a network and loaded into memory 606 and/or storage 608.

During operation of node 600, portions of host operating system 662 will be loaded in memory 606, along with one or applications 664 that are executed in OS user space. Upper protocol layer software 666 generally may be implemented using an OS driver or the like, or may be implemented as a software component executed in OS user space. In some embodiments, upper protocol layer software 666 may be implemented in a virtual NIC implemented through use of virtualization software, such as a Virtual Machine Monitor (VMM) or hypervisor.

In the embodiment illustrated in FIG. 6, MAC module 630 is depicted as part of network interface 610, which comprises a hardware component. Logic for implementing various operations supported by network interface 610 may be implemented via embedded logic and/or embedded software. As an example, embedded logic may be employed for preparing upper layer non-TCP packets for transfer outbound from transmit port 642. This includes encapsulation of non-TCP packets in Ethernet packets, and then framing of the Ethernet packets, wherein Ethernet packets are used to generate a stream of Ethernet frames. In connection with these outbound (transmit) operations, real-time clock 628 is accessed (e.g., read) and a corresponding timestamp is added to an applicable field in each Ethernet packet encapsulating non-TCP traffic that is to be forwarded along a path for which non-TCP traffic management is implemented.

On the receive side, a reversal of the foregoing transmit operations is performed. As data signals conveying Ethernet frames are received, they are processed by PHY circuitry 634 to regenerate an Ethernet frame stream (originally generated from a source end-node sending traffic to node 600), whereupon the Ethernet frames are deframed, to yield Ethernet packets, that are then decapsulated to extract the higher layer protocol non-TCP packets. In connection with these operations, a destination receive timestamp may be generated by reading real-time clock 628 and either adding corresponding timestamp data to the Ethernet packet or to a temporary buffer entry that is associated with the Ethernet packet during packet processing. In one embodiment configured to measure BRTT and RTT values, the source transmit timestamp is read from a received packet and subtracted from the real-time clock reading, with the difference written back to the same field that was used to store the source transmit timestamp.

Generally, packet processing block 630 may be implemented via embedded logic and/or embedded software. Packet processing block is implemented to manage forwarding of data within network interface 610 and also between network interface 610 and memory 606. This includes use of DMA engine 622 which is configured to forward data from receive buffer 626 to memory 606 using DMA writes, resulting in data being forwarded via PCIe interfaces 620 and 618 to memory 606 in a manner that doesn't involve CPU 612. In some embodiments, transmit buffer 624 and receive buffer 626 comprises Memory-Mapped IO (MMIO) address space that is configured to facilitate DMA data transfers between these buffers and memory 606 using techniques well-known in the networking art.

As described above with reference FIGS. 5a, 5b, and 5c, none, all, or a portion of the MAC layer operations may be implemented in software running on host processor 604. In one embodiment using a split-MAC architecture, Ethernet packet encapsulation and decapsulation operations are implemented in software, while Ethernet framing and deframing is implemented via hardware (e.g., via embedded logic or embedded software on network interface 610). Under one embodiment using software-based Ethernet packet encapsulation and decapsulation, a real-time clock is implemented in processor 604 and accessed by applicable software and added to Ethernet packets (or an encapsulated L4 packet) when the Ethernet packets are written to transmit buffer 624. Similarly, destination receive timestamps may be implemented by the software when deframed Ethernet packets are forwarded to the upper protocol layer software 666.

The embodiments described and illustrated herein enable non-TCP traffic to be managed in a manner that achieves a similar performance level to managing TCP traffic using DCTCP techniques. The use of DCTCP has proven to be advantageous for managing TCP traffic in data center environments and the like. Similarly, use of the techniques provided herein extend DCTCP-like performance to non-TCP traffic, opening up the possibility of efficiently managing traffic such as RoCE and FCoE traffic in data center environments.

Further aspects of the subject matter described herein are set out in the following numbered clauses:

Clause 1. A method for implementing congestion management of non-TCP (Transmission Control Protocol) traffic in a network, comprising:

determining a non-congested transit latency for a path between a source end-node and a destination end-node, wherein the path traverses at least one switch;

measuring transmit latencies for transfer of non-TCP packets or Ethernet frames encapsulating non-TCP packets along the path;

determining, for transfer of at least a portion of the non-TCP packets or Ethernet frames, whether to mark the path as congested or not congested based on a difference between the transit latency measured for the non-TCP packet or Ethernet frame and the non-congested transit latency for the path; and managing a rate at which the non-TCP packets are transmitted from the source end-node to be forwarded via the path to the destination end-node based as a function of a rate at which the path is marked as congested.

Clause 2. The method of clause 1, further comprising mimicking Data Center TCP (DCTCP) for non-TCP traffic by:

inputting into a DCTCP algorithm a congestion marking status of the path in place of using a congestion marking status conveyed via an ECN-Echo flag as an input to the DCTCP algorithm; and employing a congestion windows (cwnd) output by the DCTCP algorithm to manage the rate at which the non-TCP packets are transmitted from the source end-node.

Clause 3. The method of clause 1 or 2, wherein the non-congested transit latency is measured along a one-way path from the source end-node to the destination end-node, and the transmit latencies for the transfer of the non-TCP packets or the Ethernet frames is measured along the same one-way path.

Clause 4. The method of clause 3, further comprising:

measuring a best frame transfer time (BFTT) along a source-destination path from the source end-node to the destination end-node, and storing the BTT for the source-destination path;

for each of a plurality of Ethernet frames encapsulating non-TCP packets, measuring a frame transfer time (FTT) along the source-destination path for the Ethernet frames;

subtracting the BFTT from the FTT and determining whether the result of the subtraction exceeds a threshold;

if the result of the subtraction exceeds the threshold, marking a congestion flag in an ACK packet that is returned from the destination end-node to the source-destination end-node, otherwise leaving the congestion flag in the ACK packet unmarked;

detecting a marked status of the ACK packet via inspection of the congestion flag; and employing the marked status to implement congestion management for the path.

Clause 5. The method of any of the proceeding clauses, wherein the non-congested transit latency is measured along a source-destination round-trip path from the source end-node to the destination end-node and back to the source end-node, and the transmit latencies for the transfer of non-TCP packets or Ethernet frames is measured along the same roundtrip path.

Clause 6. The method of clause 5, further comprising:

measuring a best roundtrip transfer time (BRTT) along the source-destination round-trip path, and storing the BRTT for the source-destination roundtrip path;

for each of a plurality of Ethernet frames encapsulating non-TCP packets, measuring a roundtrip transfer time (RTT) along the source-destination roundtrip path for the Ethernet frames;

subtracting the BRTT from the RTT and determining whether the result of the subtraction exceeds a threshold;

if the result of the subtraction exceeds the threshold, marking the source-destination path as congested, otherwise, not marking the source-destination path as congested; and employing the marked status of the source-destination path to implement congestion management for the source-destination path.

Clause 7. The method of any of the proceeding clauses, wherein the method is implemented for a plurality of paths between a plurality of source and destination end-nodes, the plurality of paths collectively traversing a plurality of switches, and wherein the method is implemented without any modification to the switches.

Clause 8. The method of any of the proceeding clauses, wherein the method is implemented by modifying at least one of software or hardware components configured to implement a conventional non-TCP protocol only at the source end-node, wherein the destination end-node employs conventional software and hardware components for implementing the non-TCP protocol.

Clause 9. The method of any of the proceeding clauses, wherein the non-TCP traffic comprises one of RDMA over Converged Ethernet (RoCE) traffic or Fiber Channel over Ethernet traffic.

Clause 10. The method of any of the proceeding clauses, wherein the method is facilitated via the use of timestamps corresponding to when an Ethernet frame is transmitted from a transmit port and received at a receive port, and further wherein at least one timestamp is added to a field in the Ethernet frame.

Clause 11. A machine-readable non-transitory storage medium having instructions stored thereon configured to be executed on a host processor of a server comprising a source end-node to enable the source end-node to perform the method of any of clauses 1-10.

Clause 12. A server apparatus, configured to be implemented as an end-node in a data center, the server apparatus having a processor operatively coupled to memory and operatively coupled to a network interface configured to support network communication using an Ethernet protocol, the apparatus further configured, upon operation, to:

facilitate operation of the server apparatus as a source end-node;

transmit Ethernet frames outbound from the transmit port toward a destination end-node, at least a portion of the Ethernet frames encapsulating non-TCP (Transmission Control Protocol) packets, the Ethernet frames to be forwarded along a source-destination path between the server apparatus and the destination end-node and traversing at least one switch;

retrieve path congestion marking indicia received from the destination end-node for transfer of at least a portion of the Ethernet frames encapsulating non-TCP packets, the path congestion marking indicia identifying whether or not the source-destination path was marked as congested for transfer of an Ethernet frame based on a difference between a transit latency measured for the Ethernet frame by the destination end-node and a non-congested transit latency for the source-destination path; and manage a rate at which the non-TCP packets are transmitted outbound from the transmit port to be forwarded via the source-destination path to the destination end-node based as a function of a rate at which the path is marked as congested.

Clause 13. The server apparatus of clause 12, wherein the apparatus is further configured to:

input the path congestion marking indicia into a DCTCP (Data Center TCP) algorithm in place of using a congestion marking status conveyed via an ECN-Echo flag as an input to the DCTCP algorithm;

update a congestion windows (cwnd) via the DCTCP algorithm; and employ cwnd to manage the rate at which non-TCP packets are transmitted outbound from the transmit port to be forwarded via the source-destination path to the destination end-node.

Clause 14. The server apparatus of clause 12 or 13, wherein the apparatus is further configured to timestamp an Ethernet frame encapsulating a non-TCP packet proximate to when the Ethernet frame is transmitted from the transmit port.

Clause 15. The server apparatus of clause 14, wherein the timestamp is added via a software-based Ethernet MAC (Media Access Channel) layer or sub-layer implemented via execution of software on the processor.

Clause 16. The server apparatus of clause 14, wherein the timestamp is added via a hardware-based Ethernet MAC (Media Access Channel) layer or sub-layer implemented by the network interface.

Clause 17. The server apparatus of any of clauses 12-16, wherein the apparatus is further configured to:

facilitate operation of the server apparatus as a destination end-node;

retrieve a source transit timestamp contained in an Ethernet frame including an encapsulated non-TCP packet transmitted from a source end-node along a source-destination path from the source end-node to the server apparatus, the source transit timestamp identifying a time at which the Ethernet frame was transmitted from the source end-node;

retrieve a destination receive timestamp identifying a time at which the Ethernet frame is received at the receive port; and calculate a frame transit time (FTT) based on a difference between the destination receive timestamp and the source transit timestamp.

Clause 18. The server apparatus of clause 17, wherein the apparatus is further configured to:

retrieve a best frame transit time BFTT corresponding to a non-congested transit latency for the source-destination path;

determine whether a difference between the FTT for an Ethernet frame and the BFTT exceeds a threshold; and if the difference between the FTT and BFTT exceeds the threshold, return an ACK packet containing indicia indicating the source-destination path is marked as congested, otherwise, return an ACK packet containing indicia indicating the source-destination path is not marked as congested.

Clause 19. A server apparatus, configured to be implemented as an end-node in a data center, the server apparatus having a processor operatively coupled to memory and operatively coupled to a network interface configured to support network communication using the Ethernet protocol, the apparatus further comprising:

means for determining a non-congested transit latency for a path between the server apparatus when implemented as a source end-node and a destination end-node, wherein the path traverses at least one switch;

means for measuring transmit latencies for transfer of non-TCP (Transmission Control Protocol) packets or Ethernet frames encapsulating non-TCP packets along the path;

means for determining, for transfer of at least a portion of the non-TCP packets or Ethernet frames, whether to mark the path as congested or not congested based on a difference between the transit latency measured for the non-TCP packet or Ethernet frame and the non-congested transit latency for the path; and means for managing a rate at which the non-TCP packets are transmitted from the source end-node to be forwarded via the path to the destination end-node based as a function of a rate at which the path is marked as congested.

Clause 20. The server apparatus of clause 19, further comprising:

means for inputting into a DCTCP (Data Center TCP) algorithm a congestion marking status of the path in place of using a congestion marking status conveyed via an ECN-Echo flag as an input to the DCTCP algorithm; and means for employing a congestion windows (cwnd) output by the DCTCP algorithm to manage the rate at which the non-TCP packets are transmitted from the source end-node.

Clause 21. The server apparatus of clause 19 or 20, wherein the non-congested transit latency is measured along a one-way path from the source end-node to the destination end-node, and the transmit latencies for the transfer of the non-TCP packets or the Ethernet frames is measured along the same one-way path.

Clause 22. The server apparatus of clause 21, further comprising:

means for measuring a best frame transfer time (BFTT) along a source-destination path from the source end-node to the destination end-node, and storing the BFTT for the source-destination path;

for each of a plurality of Ethernet frames encapsulating non-TCP packets, means for measuring a frame transfer time (FTT) along the source-destination path for the Ethernet frames;

means for subtracting the BFTT from the FTT and determining whether the result of the subtraction exceeds a threshold;

means for determining if the result of the subtraction exceeds the threshold;

means for marking a congestion flag in an ACK packet that is returned from the destination end-node to the source-destination end-node if the result of the subtraction exceeds the threshold, otherwise leaving the congestion flag in the ACK packet unmarked;

means for detecting a marked status of the ACK packet via inspection of the congestion flag; and means for employing the marked status to implement congestion management for the path.

Clause 23. The server apparatus of any of clauses 19-22, wherein the non-congested transit latency is measured along a source-destination round-trip path from the source end-node to the destination end-node and back to the source end-node, and the transmit latencies for the transfer of non-TCP packets or Ethernet frames is measured along the same roundtrip path.

Clause 24. The server apparatus of any of clauses 19-23, further comprising:

means for measuring a best roundtrip transfer time (BRTT) along the source-destination round-trip path, and storing the BRTT for the source-destination roundtrip path;

for each of a plurality of Ethernet frames encapsulating non-TCP packets, means for measuring a roundtrip transfer time (RTT) along the source-destination roundtrip path for the Ethernet frames;

means for subtracting the BRTT from the RTT and determining whether the result of the subtraction exceeds a threshold;

means for marking the source-destination path as congested if the result of the subtraction exceeds the threshold, otherwise, not marking the source-destination path as congested; and means for employing the marked status of the source-destination path to implement congestion management for the source-destination path.

Clause 25. A machine-readable non-transitory storage medium having instructions stored thereon configured to be executed on a host processor of a server comprising a source end-node to enable the source end-node to:

transmit Ethernet frames outbound from a transmit port of the source end-node toward a destination end-node, the Ethernet frames to be forwarded along a path between the source end-node and the destination end-node including at least one switch;

determine a non-congested transit latency for the path;

at least one of, determine, for transfer of at least a portion of the Ethernet frames encapsulating non-TCP packets, whether to mark the path as congested or not congested based on a difference between a transit latency measured for the Ethernet frame and the non-congested transit latency for the path; or retrieve path congestion marking indicia received from the destination end-node for transfer of at least a portion of the Ethernet frames encapsulating non-TCP packets, the path congestion marking indicia identifying whether or not the path was marked as congested for transfer of an Ethernet frame based on a difference between a transit latency measured for the Ethernet frame by the destination end-node and the non-congested transit latency for the path; and manage a rate at which the non-TCP packets are transmitted outbound from the transmit port of the source end-node to be forwarded via the path to the destination end-node based as a function of a rate at which the path is marked as congested.

Clause 26. The machine-readable non-transitory storage medium of clause 25, wherein the instructions are configured to enable the source end-node to:

maintain an estimate a of the fraction of Ethernet frames that are marked, which is updated once for every window of data using the equation, $$a \leftarrow (1-g) \times a + g \times F$$

where F is the fraction of packets that were marked in the last window of data, and g is a weight between 0 and 1 given to new samples against the past in the estimation of a;

input a into the following equation to adjust a size of a congestion window (cwnd), $$cwnd \leftarrow cwnd \times (1-a/2);$$

and employ cwnd to manage rate at which the non-TCP packets are transmitted outbound from the transmit port of the source end-node to be forwarded via the path to the destination end-node.

Clause 27. The machine-readable non-transitory storage medium of clause 25 or 26, wherein the non-congested transit latency is determined by measuring transit latency along a source-destination round-trip path from the source end-node to the destination end-node and back to the source end-node, and the transmit latencies for the transfer of the Ethernet frames encapsulating non-TCP packets is measured along the same roundtrip path.

Clause 28. The machine-readable non-transitory storage medium of clause 27, wherein the instructions are configured to enable the source end-node to:

measure a best roundtrip transfer time (BRTT) along the source-destination round-trip path, and storing the BRTT for the source-destination roundtrip path;

for each of a plurality of Ethernet frames encapsulating non-TCP packets, measure a roundtrip transfer time (RTT) along the source-destination roundtrip path for the Ethernet frames;

subtract the BRTT from the RTT and determining whether the result of the subtraction exceeds a threshold;

if the result of the subtraction exceeds the threshold, marking the source-destination path as congested, otherwise, not marking the source-destination path as congested; and employ the marked status of the source-destination path to implement congestion management for the source-destination path.

Clause 29. The machine-readable non-transitory storage medium of any of clauses 25-28, wherein the instructions are configured to embed a source transit timestamp in an Ethernet frame indicating when the Ethernet frame was transmitted outbound from the transmit port of the source end-node.

Clause 30. The machine-readable non-transitory storage medium of clause 29, wherein path congestion marking indicia is received from the destination end-node, and wherein the instructions are configured to inspect a congestion flag in an ACK packet comprising the path congestion marking indicia that is returned by the destination end-node in response to receiving an Ethernet frame encapsulating a non-TCP packet from the source-node, the congestion flag including indicia to whether a source-destination path along which the Ethernet frame was forwarded was congested when the Ethernet frame traversed the source-destination path.

Clause 31. The machine-readable non-transitory storage medium of clause 30, further having instructions stored thereon configured to be executed on a host processor of a server comprising a destination end-node to enable the destination end-node to:

retrieve a source transit timestamp contained in an Ethernet frame including an encapsulated non-TCP packet transmitted from a source end-node along a source-destination path from the source end-node to the destination end-node, the source transit timestamp identifying a time at which the Ethernet frame was transmitted from the source end-node;

retrieve a destination receive timestamp identifying a time at which the Ethernet frame is received at the destination end-node; and calculate a frame transit time (FTT) based on a difference between the destination receive timestamp and the source transit timestamp.

Clause 32. A method for implementing congestion management of non-TCP (Transmission Control Protocol) traffic in a network, comprising:

receiving, at a destination end-node, an Ethernet frame containing a non-TCP (Transmission Control Protocol) packet transmitted from a source end-node, the Ethernet frame having been forwarded along a Source-Destination (S-D) path between the source end-node and the destination end-node and at least one of the Ethernet frame or non-TCP packet including a first timestamp corresponding to a time when the Ethernet frame was transmitted from the source end-node;

generating a second timestamp corresponding to a time when the Ethernet frame was received at the destination end-node;

calculating a difference between the second and first timestamps to calculate a frame transmit time (FTT) for the S-D path;

calculating a difference between the FTT and a best frame transmit time (BFTT) for the S-D path to determine whether the difference exceeds a threshold;

generating an ACK packet to be returned to the source end-node, the ACK packet including a Congestion flag; and if the difference between the FTT and BFTT exceeds the threshold, marking the Congestion flag as True, otherwise marking the Congestion flag as False.

Clause 33. The method of clause 32, further comprising:

for implementing congestion management of non-TCP (Transmission Control Protocol) traffic in a network, comprising:

receiving a plurality of Ethernet frames at the destination end-node transmitted from the source end-node along the S-D path, each Ethernet frame including a first timestamp corresponding to a time when the Ethernet frame was transmitted from the source end-node;

generating a second timestamp corresponding to a time when each Ethernet frame was received at the destination end-node;

calculating a FTT for each Ethernet frame; and determining a lowest FTT, and storing the lowest FTT as the BTT for the S-D path.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. software content (e.g., data, instructions, configuration) may be provided via an article of manufacture including a non-transitory, tangible computer- or machine-readable storage medium, which provides content that represents instructions that can be executed. The content may result in a computer performing various functions/operations described herein.

As discussed above, various aspects of the embodiments herein may be facilitated by corresponding software and/or firmware components and applications, such as software running on a host processor or firmware or embedded software executed by an embedded processor or logic on a network interface. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable non-transitory medium.

A computer- or machine-readable non-transitory storage medium includes any mechanism that provides (i.e., stores and/or transmits) information in a form accessible by a computer or machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer- or machine-readable non-transitory storage medium may also include a storage or database from which content can be downloaded. A computer- or machine-readable non-transitory storage medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for implementing congestion management of non-TCP (Transmission Control Protocol) traffic in a network, comprising:
   determining a non-congested transit latency for a path between a source end-node and a destination end-node, wherein the path traverses at least one switch and the non-congested transit latency is an overall transit latency for the path;
   measuring transit latencies for transfer of non-TCP packets or Ethernet frames encapsulating non-TCP packets along the path between the source end-node and the destination end-node, each transit latency that is measured for a non-TCP packet or an Ethernet frame encapsulating a non-TCP packet comprising an overall transit latency for the path;
   determining, for transfer of each of at least a portion of the non-TCP packets or Ethernet frames, whether to mark the path as congested or not congested based on a difference between the transit latency measured for the non-TCP packet or Ethernet frame and the non-congested transit latency determined for the path; and
   managing a rate at which the non-TCP packets are transmitted from the source end-node to be forwarded via the path to the destination end-node based as a function of a rate at which the path is marked as congested,
   wherein the non-congested transit latency is an overall transit latency that is measured along a one-way path from the source end-node to the destination end-node, and each of the transit latencies for the transfer of the non-TCP packets or the Ethernet frames is an overall transit latency that is measured along the same one-way path.

2. The method of claim 1, further comprising mimicking Data Center TCP (DCTCP) for non-TCP traffic by:
   inputting into a DCTCP algorithm a congestion marking status of the path in place of using a congestion marking status conveyed via an ECN-Echo flag as an input to the DCTCP algorithm; and
   employing a congestion windows (cwnd) output by the DCTCP algorithm to manage the rate at which the non-TCP packets are transmitted from the source end-node.

3. The method of claim 1, further comprising:
   measuring a best frame transit time (BFTT) along a source-destination path from the source end-node to the destination end-node, and storing the BFTT for the source-destination path;
   for each of a plurality of Ethernet frames encapsulating non-TCP packets, measuring a frame transfer time (F) along the source-destination path for the Ethernet frames;
   subtracting the BFTT from the FIT and determining whether the result of the subtraction exceeds a threshold;
   if the result of the subtraction exceeds the threshold, marking a congestion flag in an ACK packet that is returned from the destination end-node to the source-destination end-node, otherwise leaving the congestion flag in the ACK packet unmarked;
   detecting a marked status of the ACK packet via inspection of the congestion flag; and employing the marked status to implement congestion management for the path.

4. The method of claim 1, wherein the method is implemented for a plurality of paths between a plurality of source and destination end-nodes, the plurality of paths collectively traversing a plurality of switches, and wherein the method is implemented without any modification to the switches.

5. The method of claim 1, wherein the method is implemented by modifying at least one of software or hardware components configured to implement a conventional non-TCP protocol only at the source end-node, wherein the destination end-node employs conventional software and hardware components for implementing the non-TCP protocol.

6. The method of claim 1, wherein the non-TCP traffic comprises one of RDMA over Converged Ethernet (RoCE) traffic or Fiber Channel over Ethernet traffic.

7. The method of claim 1, wherein the method is facilitated via the use of timestamps corresponding to when an Ethernet frame is transmitted from a transmit port and received at a receive port, and further wherein at least one timestamp is added to a field in the Ethernet frame.

* * * * *